United States Patent
Boardman et al.

(10) Patent No.: US 6,456,986 B1
(45) Date of Patent: Sep. 24, 2002

(54) DECISION NETWORK BASED EVENT PRICING SYSTEM IN A COMPONENT BASED, OBJECT ORIENTED CONVERGENT CUSTOMER CARE AND BILLING SYSTEM

(75) Inventors: Stuart Boardman, Amsterdam (NL); Andreas Rübesam, Meerbusch (DE)

(73) Assignee: American Management Systems, Incorporated, Fairfax, VA (US)

(*) Notice: Subject to any disclaimer, the term of this patent is extended or adjusted under 35 U.S.C. 154(b) by 0 days.

(21) Appl. No.: 09/353,588

(22) Filed: Jul. 15, 1999

Related U.S. Application Data (60) Provisional application No. 60/094,459, filed on Jul. 29, 1998, now abandoned.

(51) Int. Cl.[7] .............................................. G06F 17/60
(52) U.S. Cl. ................. 705/400; 379/111; 379/114.01; 379/114.03; 705/30; 705/34; 705/418
(58) Field of Search .................................. 379/111, 114; 455/405, 406; 705/1, 30, 34, 51, 52, 53, 59, 400, 418

(56) References Cited

U.S. PATENT DOCUMENTS

| | | | | |
|---|---|---|---|---|
| 4,286,325 A | * | 8/1981 | Dlugos et al. | 705/402 |
| 5,027,388 A | * | 6/1991 | Bradshaw et al. | 379/112 |
| 5,063,506 A | * | 11/1991 | Brockwell et al. | 705/7 |
| 5,414,624 A | * | 5/1995 | Anthonyson | 701/1 |
| 5,570,291 A | * | 10/1996 | Dudle et al. | 700/95 |
| 5,659,601 A | * | 8/1997 | Cheslog | 455/406 |
| 5,737,710 A | * | 4/1998 | Anthonyson | 701/1 |
| 5,784,443 A | | 7/1998 | Chapman et al. | 379/119 |
| 5,790,643 A | * | 8/1998 | Gorden et al. | 379/119 |
| 5,815,560 A | * | 9/1998 | Kasai et al. | 379/114 |
| 5,852,812 A | * | 12/1998 | Reeder | 705/39 |
| 5,923,741 A | * | 7/1999 | Wright et al. | 379/114 |
| 6,018,725 A | * | 1/2000 | Boucher et al. | 705/401 |
| 6,041,318 A | * | 3/2000 | Danford-Klein et al. | 705/400 |
| 6,047,271 A | * | 4/2000 | Danford-Klein et al. | 705/400 |
| 6,061,667 A | * | 5/2000 | Danford-Klein et al. | 705/400 |
| 6,078,889 A | * | 6/2000 | Boucher et al. | 705/1 |
| 6,199,047 B1 | * | 3/2001 | Dimino et al. | 705/10 |

FOREIGN PATENT DOCUMENTS

| | | |
|---|---|---|
| EP | 0809387 A2 | 11/1997 |
| JP | 03-35352 * | 2/1991 |
| JP | 11-331440 * | 11/1999 |
| WO | 95/24093 | 9/1995 |

OTHER PUBLICATIONS

Yasin: "Suite with Global View for Analyzing and Planning Telecom Networks"; Communications Week, Apr. 1, 1996, v603, p. 69.*

Ness et al: "Average cost pricing in the compound feed industry" British Food Journal; 1995, v97, n11, pp. 27–35.*

Geoff Mason, "Evolution of BT's Billing Systems", British Telecommunications Engineering, vol. 11, 1993, pps. 262–268.

International Search Report, PCT/US99/16790, Nov. 1999, pps. 1–2.

* cited by examiner

Primary Examiner—Edward R. Cosimano
(74) Attorney, Agent, or Firm—Staas & Halsey, LLP

(57) ABSTRACT

A ratings engine system that uses decision networks to select and execute Price Plans to rate an Event. A plan selection rule set is used to select a Price Plan for the Event and an Algorithm rule set is used to select an Algorithm to rate the Event. The Price Plans and rule sets are stored in a database. Conditions are also evaluated as the rule sets are traversed and include a program that determines if an Event qualifies for the Condition. Conditions can have a range or domain of applicability. The changing of the decision network changes the business rules for the Event without changing the Algorithms or Conditions.

18 Claims, 8 Drawing Sheets

FIG. 1
PLAN SELECTION RULE SET

DECISION NETWORK BASED EVENT PRICING SYSTEM IN A COMPONENT BASED, OBJECT ORIENTED CONVERGENT CUSTOMER CARE AND BILLING SYSTEM

CROSS REFERENCE TO RELATED APPLICATIONS

This application is related to and claims priority to U.S. provisional application Ser. No. 60/094,459, filed Jul. 29, 1998, entitled Component Based, Object Oriented Convergent Customer Care And Billing System by Hohmann et. al. and which is incorporated herein by reference. This application is also related to concurrently filed U.S. application entitled Meta-Language For C++ Business Applications by Hohmann and Duymelinck, having Ser. No. 09/353,394 filed on Jul. 15, 1999 and which is incorporated herein by reference.

BACKGROUND OF THE INVENTION

1. Field of the Invention

The present invention is directed to using a decision network to evaluate a Price Plan and an Event rating for rating customer transactions, and, more particularly, to a system that rates and/or discounts Events based on business rules stored in a Price Plan database.

2. Description of the Related Art

Flexible pricing plans are becoming ever more important in satisfying the needs of customers. Conventional pricing plans use simple hierarchical pricing structures, such as usage based pricing. Complex Price Plan structures are not suitable for such hierarchical arrangements. What is needed is a system that supports complex Price Plan structures used to rate Events.

SUMMARY OF THE INVENTION

It is an object of the present invention to use decision networks to facilitate complex Price Plan structures used to rate and/or discount Events.

It is another object of the present invention to provide a system that supports conditional branching in a Price Plan.

It is a further object of the present invention to provide a business with the competitive advantage of creating complex pricing models attractive to the business customers.

It is an additional object of the present invention to provide a flexible solution for Price Plans that can be used in an environment that requires high performance, such as real time rating of telecommunications Events.

The above objects can be attained by a system that uses decision networks to execute a Price Plan to rate an Event. A plan selection rule set is used to select a Price Plan for the Event and an Algorithm rule set is used to select an Algorithm to rate the Event. Conditions are also evaluated as the rule sets are traversed and include a program that determines if an Event qualifies for the Condition.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention introduces the use of decision networks to facilitate complex Price Plan structures used to rate and/or discount Events. Price Plans provide the supplier with the possibility of defining pricing models or structures used to rate Events. Price Plans also provide flexibility in changing a pricing model to meet market demands quickly. An Event represents a transaction between a supplier and a customer. Examples of Events in the telecommunications industry are phone calls, monthly line fees or installation charges.

In the present invention, decision networks are used to determine what Price Plan to use for an Event and how to rate the Event based on business rules. These business rules can be implemented or changed without any modifications to code by changing the decision networks. All business rules are stored in the Price Plan database. This Price Plan structure is suitable for real time or batch processing. The use of decision networks to implement Price Plan rules provides the business with the competitive advantage of creating complex pricing models attractive to its customers. The Event-pricing concept can be applied to any business domain where customers are billed for transactions that can be represented as Events. All examples herein are in the telecommunications industry domain. Further examples of business areas where using decision networks to implement Price Plan for Events is applicable include Internet Service Providers, Utilities Companies and Video On-Demand Services.

Figure 1:
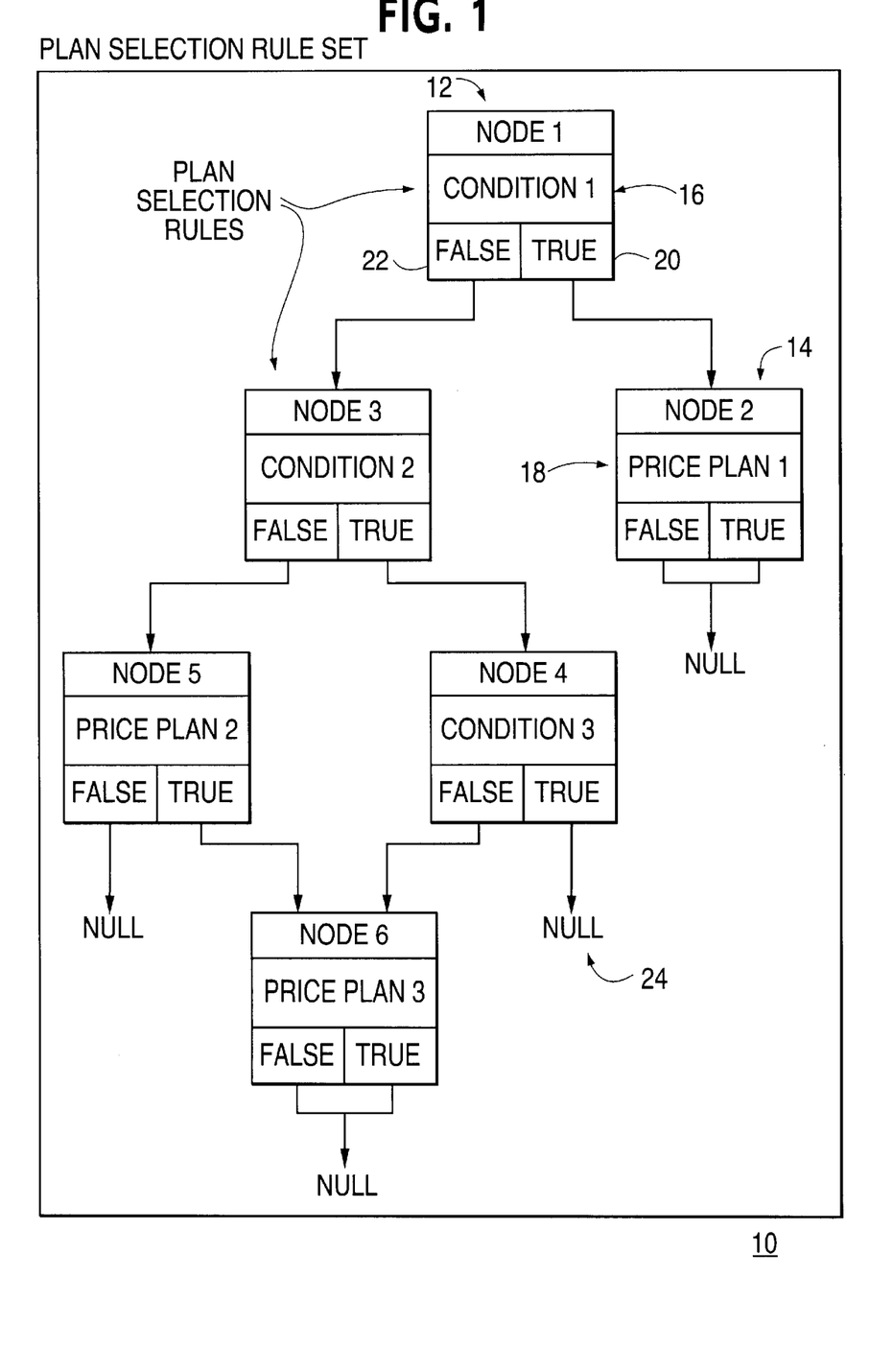
FIG. 1 illustrates a plan selection rule set of a decision network.
Figure 2:
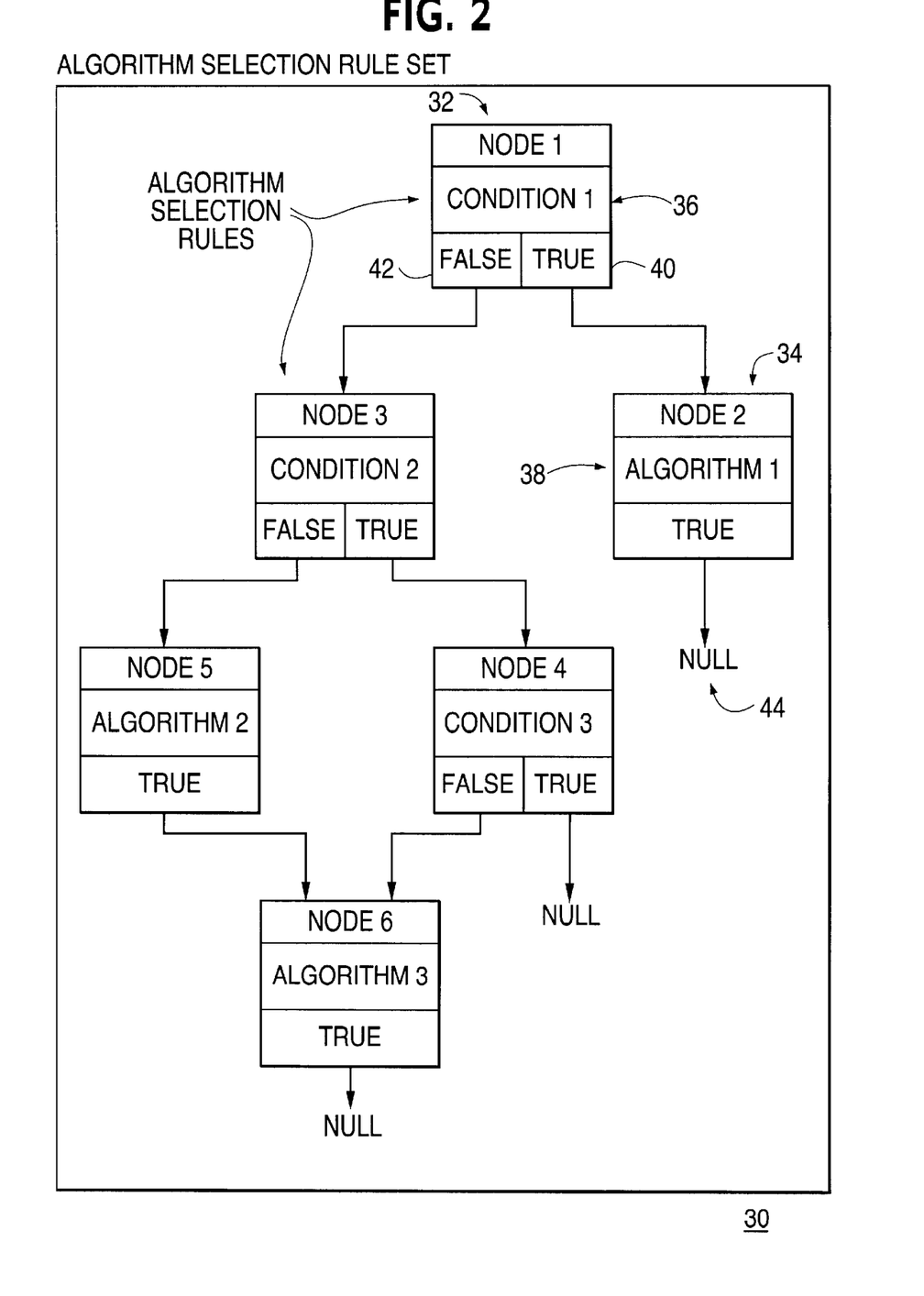
FIG. 2 illustrates an Algorithm selection rule set of a decision network.

Two types of decision networks are used, a Plan Selection Rule Set 10 and an Algorithm Selection Rule Set 30, examples of which are depicted in FIGS. 1 and 2, respectively, and which are conventionally traversed or processed. The Plan Selection Rule set essentially guides the Event to Price Plans. The Algorithm Selection Rule Set is within the Price Plan and guides the Event to Algorithms. An Algorithm calculates a price or modifies a price (applies a discount). An Event can be priced by multiple Price Plans.

The Plan Selection Rule Set 10 (see FIG. 1) is used to determine processing order and select the Price Plans, which should be used to rate and price the Event. The Plan Selection Rule Set 10 effectively manages the dependencies between Price Plans, manages exclusion relationships and enables multiple prices to be applied according to specific rules. Nodes, such as 12 and 14, in the Plan Selection Rule Set decision network are called Plan Selection Rules. A Plan Selection Rule represents either a Condition 16 to be evaluated or a Price Plan 18 to be executed. An example of a Condition is checking whether a telephone call is a fixed wire call or a cellular call. An example of a Price Plan is a pricing structure for all fixed wire calls that discounts international calls to Sweden depending on the time the call is made. Each node in the set 10 contains two pointers to child nodes, one (20) for a positive branch (TRUE) and one (22) for a negative branch (FALSE). Depending on the return value of the Condition or the Price Plan, the next node is selected. A Price Plan returns TRUE if the Event qualified for the Price Plan, FALSE if the Event didn't qualify for the Price Plan. Qualification refers to whether an Event received a rating by a Price Plan or not. When an Event is processed by an Algorithm, it is qualified for the plan and the plan will return TRUE on exit. If an Event exits a Price Plan FALSE then the Event was not guided to an Algorithm. A Condition returns TRUE if the Condition evaluated to TRUE, if it evaluates to a false Condition, FALSE is returned. Processing of an Event is complete, when the pointer to the next node in the Plan Selection Rule Set is set to NULL 24. An Event would normally not reach a NULL 24 in the Plan Selection Rule Set without being priced. If such happens, the design of the Plan Selection Rule Set and/or the Price Plans is defective.

Each Price Plan 30 (FIG. 2) contains an Algorithm Selection Rule Set used to determine the appropriate Algorithm(s) to be performed once an Event has reached the Price Plan. This arrangement provides an additional level of nested decision networks. The nodes 32 and 34 in the Algorithm Selection Rule Set 30 decision network are called Algorithm Selection Rules. An Algorithm Selection Rule represents either a Condition 36 to be evaluated or an Algorithm 38 to be applied to the Event. An example of an Algorithm is assigning rates to an Event according to the call duration and depending on the week day the call is made. Each node contains two pointers 40 and 42 to child nodes, one for a positive branch (TRUE) and one for a negative branch (FALSE). Depending on the return value of the Condition, the next node is selected. An Algorithm always returns TRUE because the Algorithm is applied to each Event that is guided to the Algorithm. When a node with no successors is encountered (where the next node Id is set to NULL 44) control returns to the calling node in the Plan Selection Rule Set. The number of nodes will depend upon the complexity of the Plan and the manner in which the user formulated the plan. Algorithm Selection Rules 30 are preferably not recursive (i.e., a Plan should not consist of other Plans).

Conditions are preferably expressed in textual form using a configuration language. A conventional configuration language can be used, however, it is preferred that the Meta Language as discussed in the related application noted previously be used. The use of a meta-language allows efficient configuration or reconfiguration of the rules for selecting and executing Price Plans. Each Condition contains source code for a small program able to determine if the Event being processed qualifies for that Condition or not. An example of a CML Condition program is "Event.network==FIXED" which performs a comparison operation to determine if the network associated with the Event is fixed. The Conditions are based on attributes of the Event object, and/or the Service or Customer associated with the Condition. The values in these attributes can be combined in complex conditional expressions using logical (and, or, not) and comparison (<, >, ==, >=, <=, etc.) operators, defined in the CML grammar. Conditions may relate to the attributes indirectly through the use of Sensitivities. Sensitivities are sets of mutually exclusive Conditions referring to one or more attributes in the Event, Service or Customer objects. Sensitivities provide a way of handling multiple and mutually exclusive Conditions. Each Condition is associated with a Domain which is a value assigned to the Event for which the given Condition results true. This way, a Condition using Sensitivities will check for the domain of a Sensitivity instead of specifying all the Conditions that constitute that Sensitivity. For example, the Sensitivity PeakHours could consist of the following three Conditions:

1.
   Condition=CallStartTime > 08:00 and CallStartTime < 18:00 and (DayOfWeek <> Saturday and DayOfWeek <> Sunday and DayOfWeek <> Holiday)
   Domain=Peak
2.
   Condition=(CallStartTime < 08:00 or CallStartTime > 18:00) and (DayOfWeek <> Saturday and DayOfWeek <> Sunday and DayOfWeek <> Holiday)
   Domain=Off-Peak
3.
   Condition=DayOfWeek==Saturday or DayOfWeek== Sunday or DayOfWeek==Holiday
   Domain=Low An example of a Condition using the Sensitivity defined above could be: "PeakHours IS Off-Peak." To determine whether a call has taken place in off peak hours the sensitivity "PeakHours IS Off-Peak" can be used to specify all Conditions necessary to formulate the determination logic. This provides reusability of complex Conditions that can be used across multiple Price Plans. Because textual Conditions are preferably compiled at run-time to minimize the performance penalty associated with this process, a memory cache is preferably used to keep the compiled versions of Conditions.

Algorithms include Processes or Operations. Each Process corresponds to a Calculation to be performed for a Price Plan and a related Tariff Model Area. A Tariff Model Area is a grouping of rates and associated Tariff Model Sensitivities that collectively can be used in a Price Plan. For example, if local calls cost 0.10/min., intrastate calls 0.12/min and interstate calls 0.15/min., then the collection of these numeric rates and associated sensitivities (in this case call types) is called a Tariff Model Area. This collection (essentially a rate structure) can be reused in many Price Plans, if applicable. The Tariff Model Area provides the calculation option values used to rate an Event depending on Tariff Model Sensitivities. Tariff Model Sensitivities can be used to define zones (area codes), tariff weeks (peek/off-peek times), and bands for tier and taper discounting. A Price Plan may consist of several Algorithms, each one used to rate different types of Events (e.g., a plan contains an Algorithm for rating calling card calls, and a separate Algorithm for rating regular direct dialed telephone calls).

A process checks whether a Detail or Summary calculation is required for a Process Step. Detail Calculations are executed immediately. Summary Calculations, e.g., Tier Discount, are performed at the end of the bill period. It is possible that an Event is rated by more than one Process within an Algorithm. This is referred to as a flow of charges. Every process step, when specifying a detail calculation, has an Add/Replace indicator. If the indicator is set to Add, the calculated result is added to the charge for the Event before the calculation was executed. Otherwise, the result of the calculation replaces the previous charge.

Figure 3:
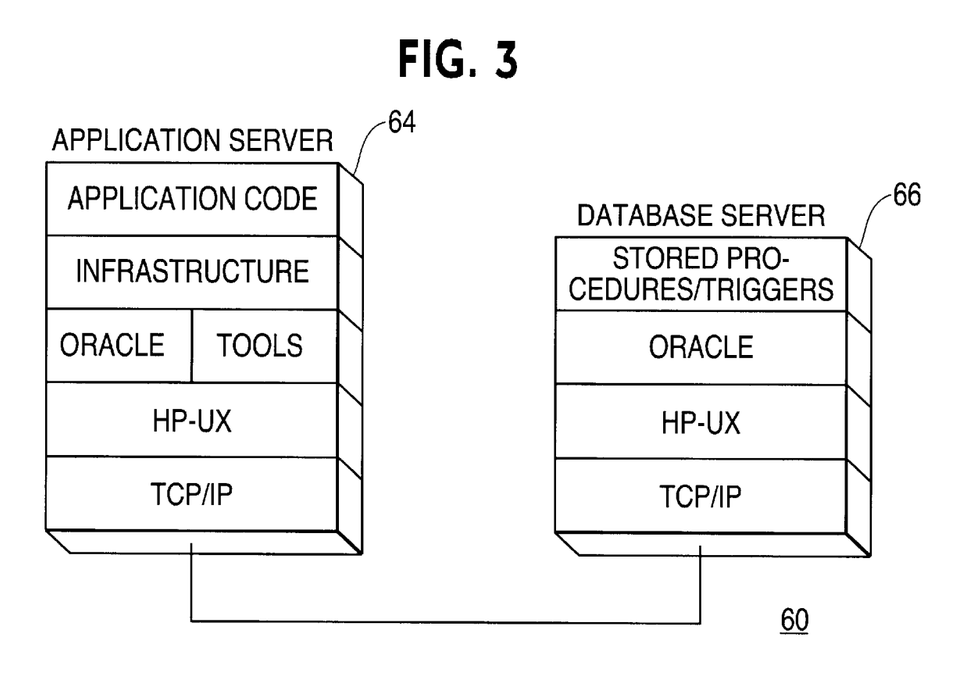
FIG. 3 depicts a preferred platform.

A rating and summarization engine application of the invention is preferably implemented in a two-tier client server system 60, as depicted in FIG. 3. An application server component 64 is preferably implemented using C++ running on a HP-UNIX platform. The system 60 uses an Oracle database system on a database server 66 to store persistent objects. The processes of the present invention can be stored and distributed on a storage medium, such as a disc, and can also be distributed over a network, such as the Internet.

Figure 4:
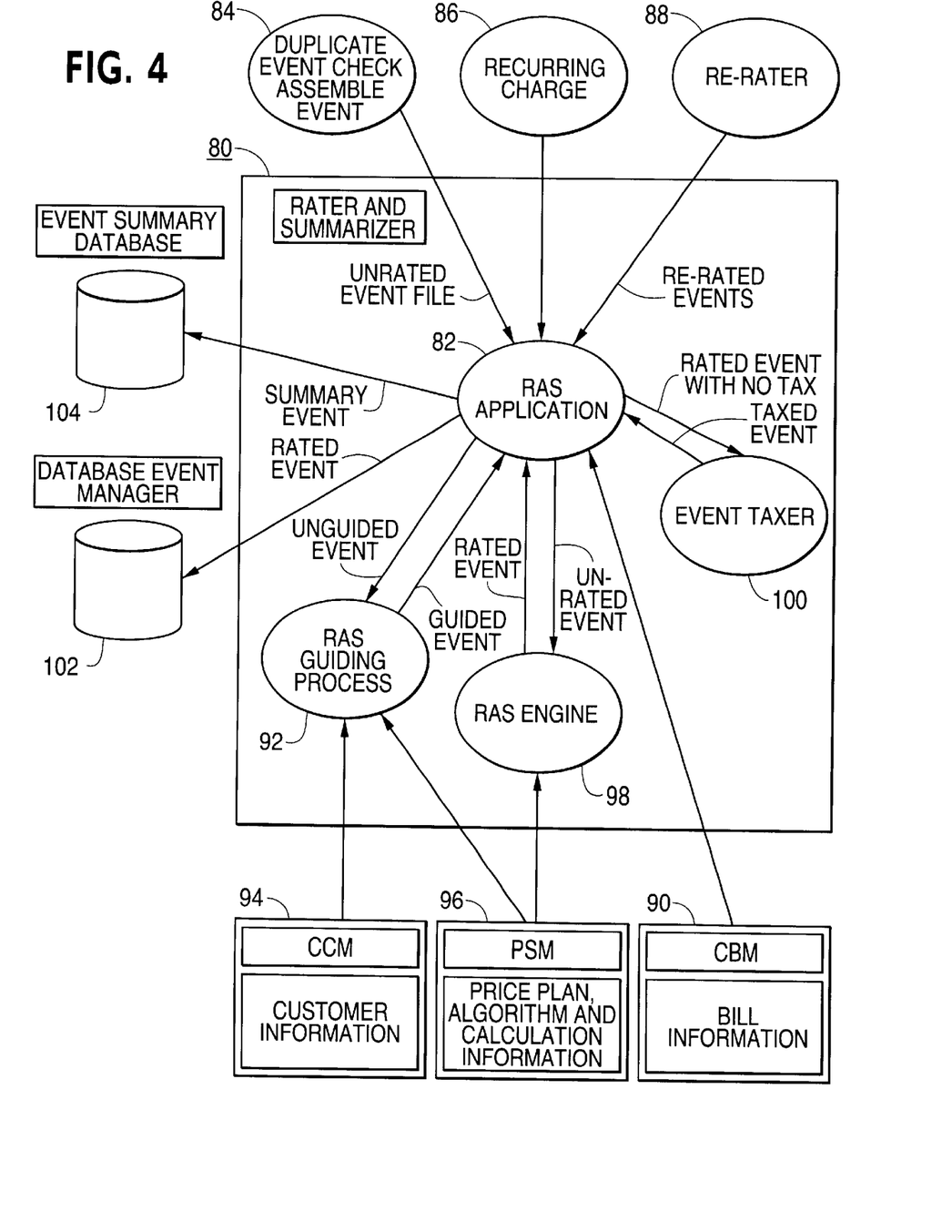
FIG. 4 shows process architecture.

FIG. 4 depicts the relationship of the present invention to a preferred software architecture. A Rater and Summarizer 80 is responsible for all real-time rating and the accumulation of Event information for end of bill period rating and pricing. The Rater and Summarizer 80 is an Event driven system. An RAS Application process 82 is the main application for the Rater and Summarizer 80. This application 82 handles all the input/output streams in the rating process e.g.—the Event files and the interfaces to the databases. The RAS Application process 82 receives Events that require rating in the form of unrated Events files created by Duplicate Event Check and Assemble Event process 84 and the Recurring Charges process 86. Further, the RAS Application process 82 receives Events that need to be re-rated from the Re-Rater process 88. The RAS Application process 82 retrieves bill information necessary for the process from a Custom Bill Manager (CBM) application 90. One Event after another is retrieved from the input files and sent to the RAS Guiding process 92. The RAS Guiding process 92 performs the guiding of an Event to a particular account, that is, the account corresponding to the Event is identified. The RAS Guiding process 92 retrieves required customer information from the Customer Care Manager application 94 and the Product Service Manager application 96. Once the guiding is complete, the guided Event is sent back to RAS Application process 82, which in turn sends the still unrated Event to an RAS Engine process 98. The RAS Engine process 98 rates and discounts the Event according to the business rules configured in the Product Service Manager application 96. The process of rating an Event is explained in greater detail in FIGS. 5 through 8. Once an Event is rated, the RAS Engine process 98 sends the rated Event and corresponding summary information back to RAS Application process 82. The RAS Application process 82 sends the rated Event to an Event Taxer process 100. The Event Taxer 100 applies the correct tax rate to the Event and sends the taxed Event to RAS Application process 82. The RAS Application process 82 now sends the rated and taxed Event to a Database Event Manager 102 and the summary Events to a Event Summary Database 104.

Figure 5:
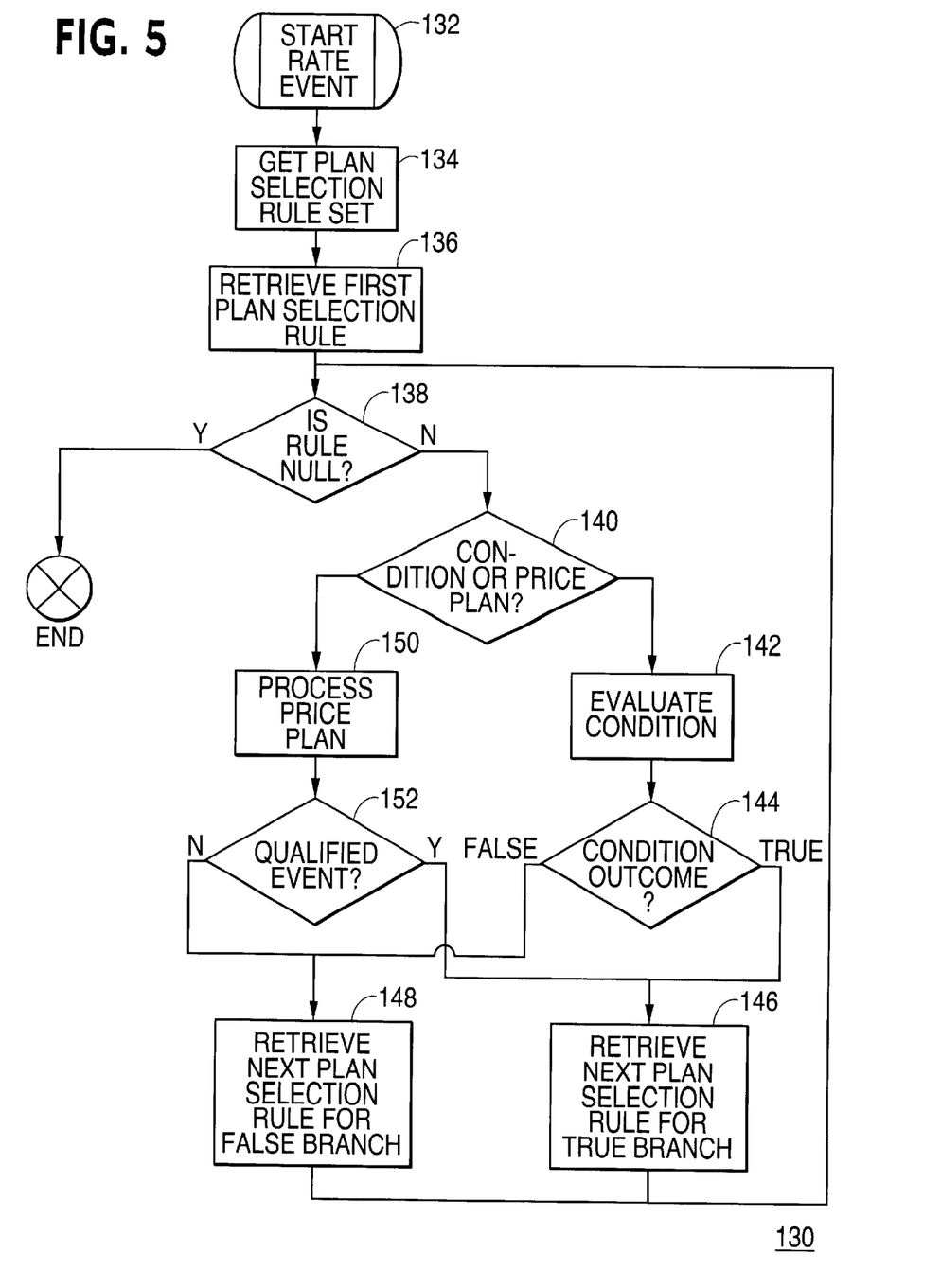
FIG. 5 depicts a process for rating an Event.
Figure 8:
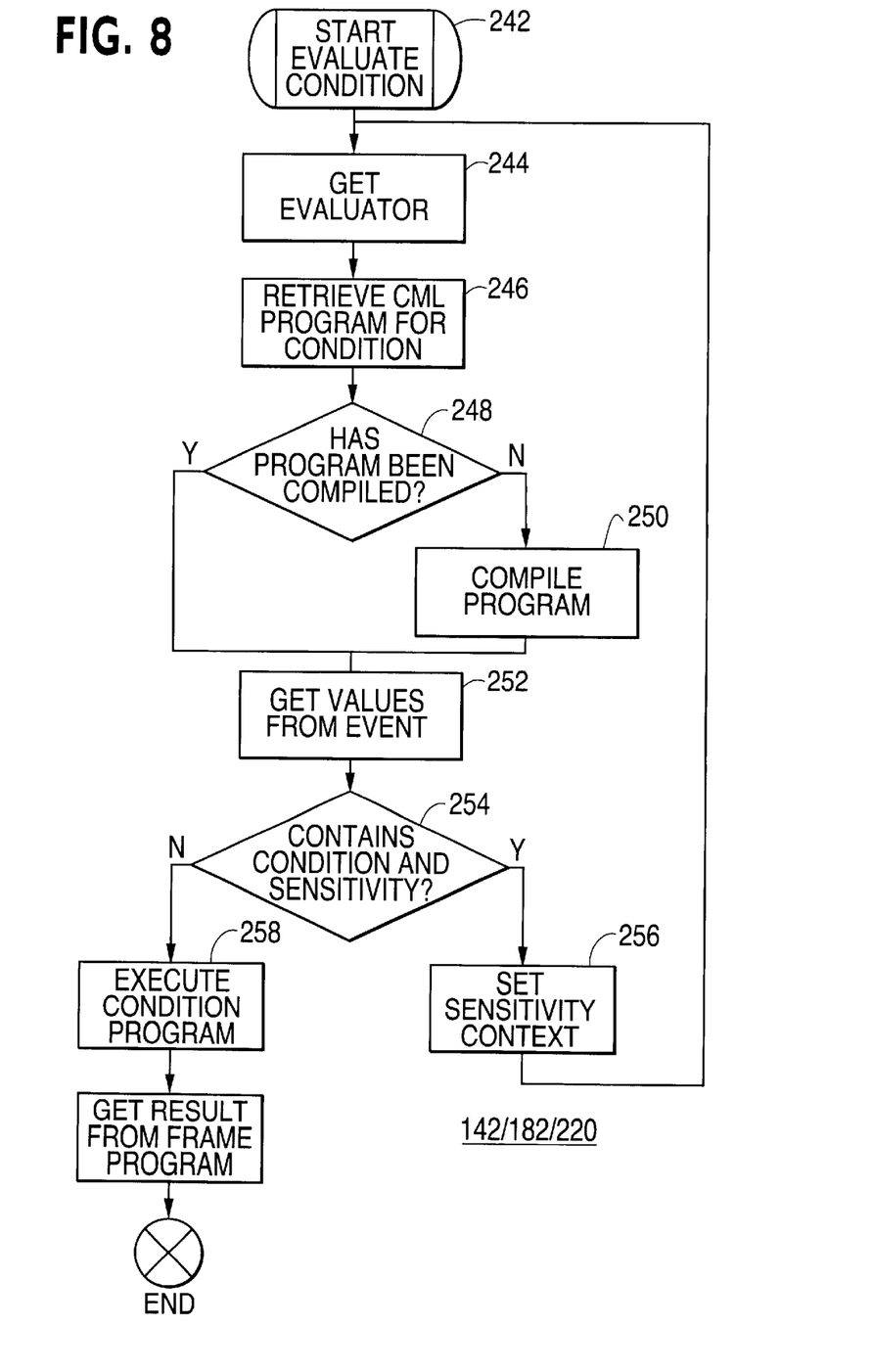
FIG. 8 depicts evaluating a Condition.

A process 130 performed by the present invention, as depicted in FIG. 5, is performed for each Event to be rated by the system. The process 130, once started 132, retrieves 134 the currently effective Plan Selection Rule Set from the Price Plan Repository 96. Then, the first Plan Selection Rule is retrieved 136 from Repository 96 for the Plan Selection Rule Set. The next operation is to evaluate the rule to determine 138 and 140 if it represents a null rule, a Condition or a Price Plan. If the rule represents a Condition, the Condition is retrieved and then evaluated 142 as shown in FIG. 8. If the Condition evaluates to TRUE 144, the Plan Selection Rule for the positive branch is retrieved 146. If the Condition evaluates to FALSE 144, the Plan Selection Rule for the negative branch is retrieved 148. If the rule represents a Price Plan, the Price Plan is retrieved and then processed 150 as described with respect to FIG. 6. If the Event qualified 152 for the Price Plan, the Plan Selection Rule for the positive branch is retrieved 146. If the Event did not qualify 152 for the Price Plan, the Plan Selection Rule for the negative branch is retrieved 148. The processing of Plan Selection Rules continues until no further rules are found (i.e., a null is reached).

Figure 6:
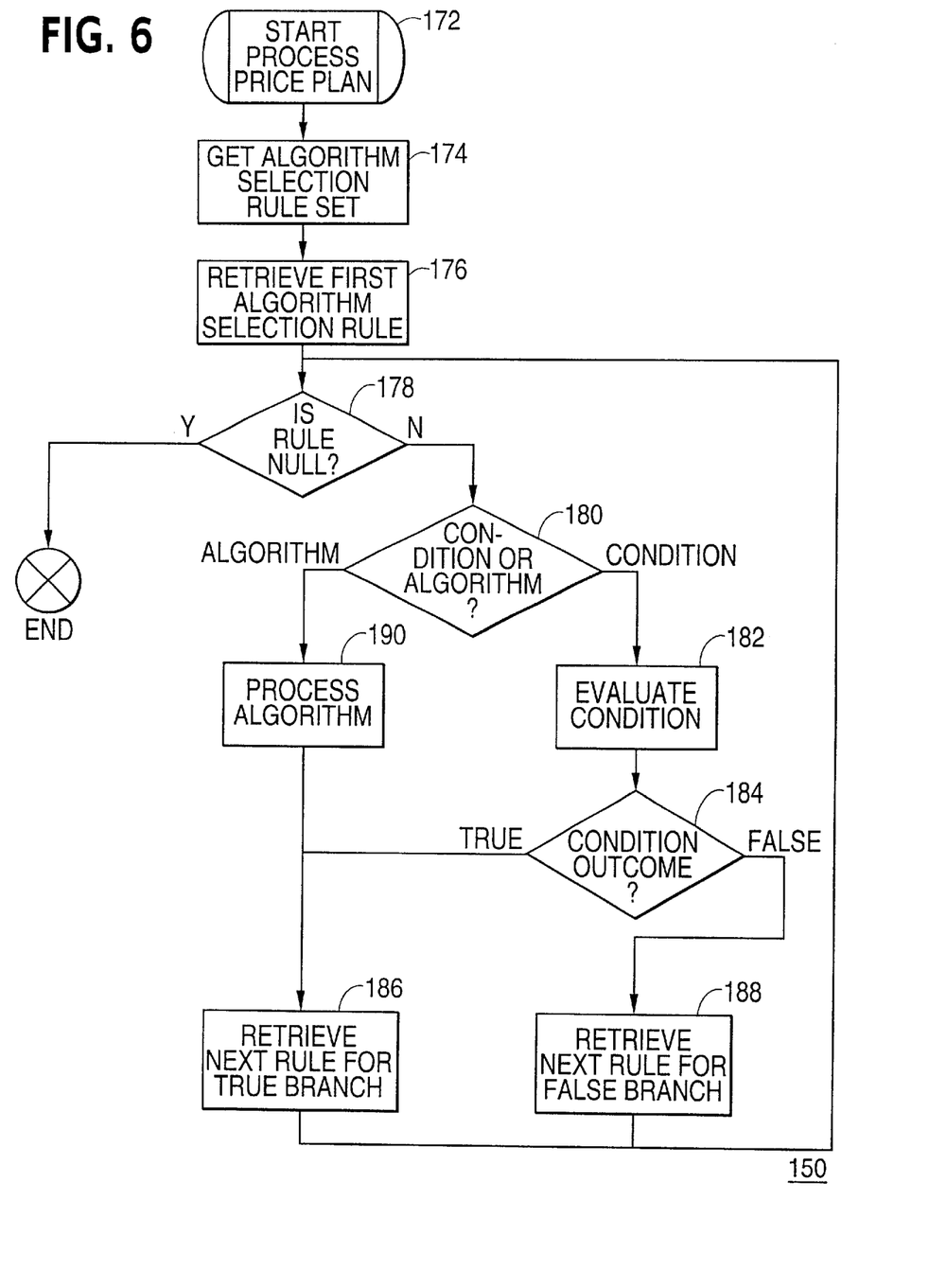
FIG. 6 depicts processing a Price Plan.

FIG. 6 depicts the processing 150 of a Price Plan. This process is executed for each Price Plan found when executing the rate Event Algorithm. This process, once started 172, retrieves 174 the currently effective Algorithm Selection Rule Set for the Price Plan from the Repository 96. Then, the first Algorithm Selection Rule is retrieved 176 for the Algorithm Selection Rule Set from the Repository 96. The next operation is to evaluate 178 and 180 if the rule is null, represents a Condition or an Algorithm. If the rule represents a Condition, the Condition is retrieved and then evaluated 182 as described in more detail with respect to FIG. 8. If the Condition evaluates 184 to TRUE, the Algorithm Selection Rule for the positive branch is retrieved 186. If the Condition evaluates to FALSE, the Algorithm Selection Rule for the negative branch is retrieved 188. If the rule represents an Algorithm, the Algorithm is retrieved 190 and then processed as described in more detail in FIG. 7. For all cases, the Plan Selection Rule for the positive branch is retrieved. The processing of Algorithm Selection Rules continues until no further rules are found.

Figure 7:
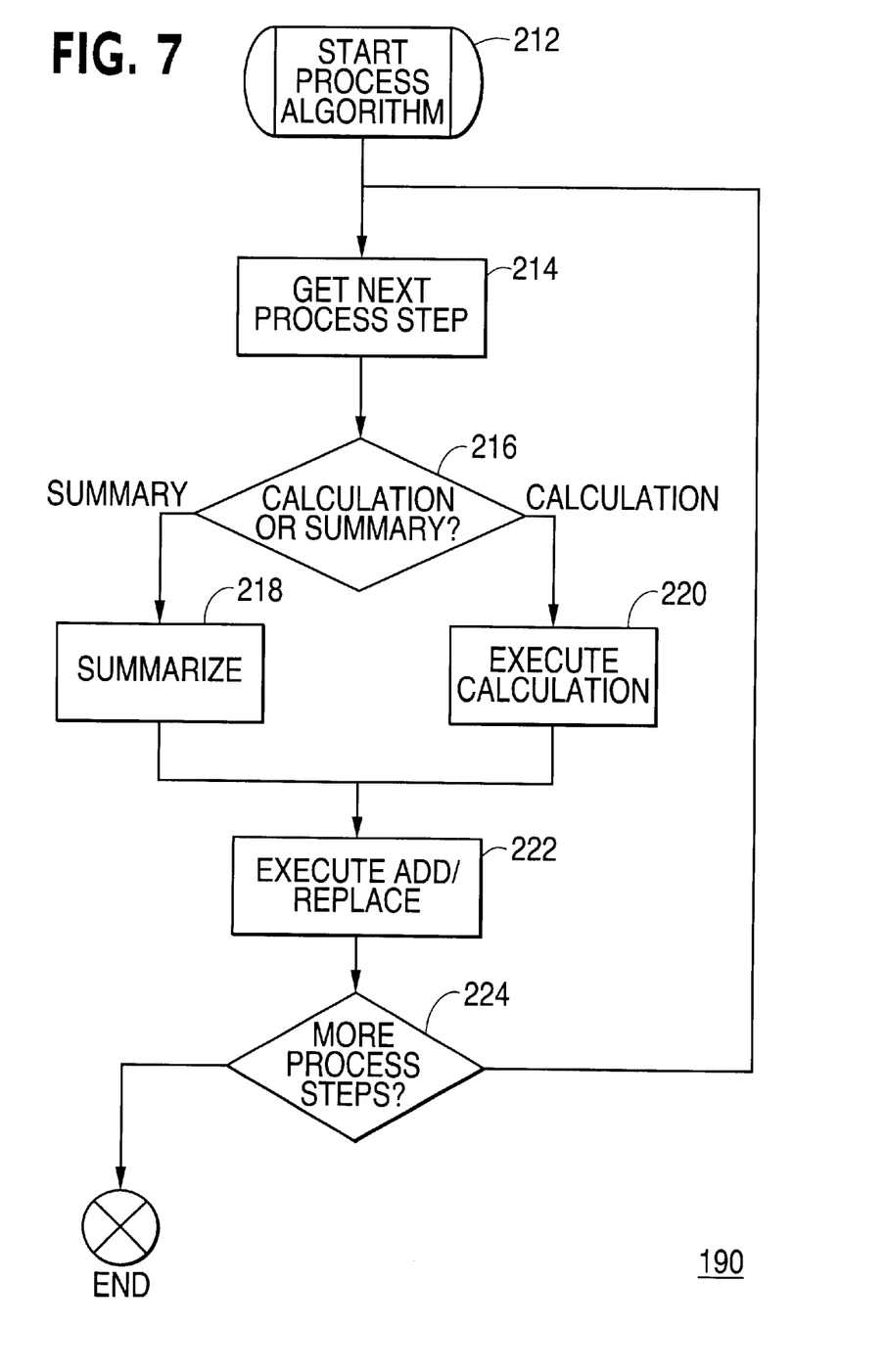
FIG. 7 depicts processing an Algorithm.

FIG. 7 depicts the process 190 performed for each Algorithm found when processing the Process Price Plan Algorithm of FIG. 6. Each Algorithm consists of one or many process steps. The process 190, once started 212, retrieves 214 the first Process Step from the Repository 96. It is then evaluated to determine 216 whether the Process Step represents a Summary or a Calculation. If the Process Step represents a Summary, a selection of Event attributes are added 218 to a corresponding summary record and the applicable summary flags are set on the Event. Attributes that are summarized include the quantity of the Event (how many kilobytes, or packets, or calls, or pages, or whatever, depending upon the unit of measure), the duration of the Event (minutes or seconds, etc.), and any associated charges. If the Process Step represents a Calculation, the Calculation is executed 220. A simple example of a Calculation is a Single Unit Calculation. In different uses, this provides a charge per unit, where the unit may be any unit of measure. A rate of $0.10 per min is a Single Unit Calculation, so is 0.06 per call, so is 0.12 per kilobit. Another good example is the Percent Discount Calculation, which gives a 10% discount, or a 20% discount, etc., upon the charge it acts upon. Depending on the type of Process Step the calculated charge is then added 222 to the existing Event charge or used to replace the existing Event charge. The system then tests 224 to determine if more steps are necessary and returns for more process steps if so.

The process 142/182/220 depicted in FIG. 8 is performed, like a subroutine, for each Condition found when processing the Rate Event or Process Price Plan Algorithms of FIGS. 5–7. The process, once started 242, retrieves 244 the Evaluator object. Then the CML program associated with the Condition is located and the evaluated 246 to determine if the program requires compilation. The programs associated with Conditions are preferably written using the business specific meta-language mentioned previously although other meta-languages can be used. The meta-language programs are compiled and executed on a virtual machine to enhance execution performance. For performance reasons, previously compiled programs are kept in a cache. The meta-language programs can be modified at run time and no changes to C++ application code are necessary. If the compiled program can be found 248, the values required to evaluate the condition are retrieved 252 from the Event. If the compiled program cannot be found 248, the program is compiled 250. The values required to evaluate the Condition are retrieved 252 from the Event. If the Condition contains 254 a Sensitivity the Evaluator context is set 256 accordingly and the Algorithm is called recursively. To prevent infinite recursion, Sensitivities preferably do not contain further Sensitivities. The Condition is then evaluated 258 and the result is fetched 260 from the program.

The meta-language program of a Condition, Sensitivity or an Algorithm can be modified without touching any application core code. The modified program will automatically be used by any Plan Selection Rule Set 10 and any Algorithm Selection Rule Set 30 referring to the particular Condition. For example, the Condition, or Sensitivity for that matter, that is used to determine Peak and Off-Peak hours, can be modified in the meta-language program. The logic executed when the Condition is evaluated, as part of a Plan Selection Rule Set 10 and an Algorithm Selection Rule Set 30, is replaced by the modified program. The changing of a Algorithm, Condition or Sensitivity typically involves accessing the meta-language program. The program can be kept as reference data in the database or in files associated with the database. Changing an Algorithm or an Tariff Model Area/Tariff Model Area Sensitivity typically involves the use of SQL scripts. A conventional text editor is used by a designer/programmer to edit the text of the Algorithm, Sensitivity, Condition or SQL script to change the logic or parameters. Changes in a decision network sequence are made by changing the pointers in the network from one node to another node. As can be seen, changes in both the logic of the decision networks and the logic of Conditions, Sensitivities and Algorithms can be accomplished without changing core code.

The present invention has been described with respect to a preferred platform. The platform or programming languages used can, of course, be varied. A commercial rules engine could also be used to interpret Price Plan rules. Additionally, application code can be used instead of meta-language programs. The Event-pricing of the present invention can also be applied to any business domain where customers are billed for transactions that can be represented as Events.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus, comprising:
   storage storing a price plan and a corresponding decision network; and
   a processor obtaining an event to be rated, evaluating the decision network to determine within an applicable price plan according to the event to be processed, and processing the decision network within the applicable price plan selecting a rating algorithm guiding the event to algorithms to calculate or modify a price and managing dependencies between price plans rating the event.

2. An apparatus as recited in claim 1, wherein said processor processes the rating algorithm during processing of the price plan.

3. An apparatus as recited in claim 1, wherein said processor traverses a plan selection rule set to select a price plan to evaluate and traverses an algorithm selection rule set to select an algorithm to rate the event.

4. An apparatus as recited in claim 1, wherein said processor processes a global decision network to select a price plan, processes a price plan decision network to select a rating algorithm and processes the algorithm to rate the event.

5. An apparatus as recited in claim 1, wherein said processor evaluates a condition during processing of the price plan.

6. An apparatus as recited in claim 5, wherein said condition comprises an event qualification determination program.

7. An apparatus, comprising:
   storage storing a price plan and a corresponding decision network; and
   a processor obtaining an event to be rated, and rating and summarizing the event by evaluating the price plan using the decision network, the decision network comprising
      a plan selection rule set selecting the price plan according to the event, and
      an algorithm selection rule set according to the price plan selected guiding the event to algorithms to calculate or modify a price, and managing dependencies between price plans rating the event.

8. A billing apparatus for rating a telecommunications transaction billing event, comprising:
   storage for storing price plans and decision networks of a telecommunications customer care and billing system; and
   a processor obtaining the telecommunications transaction billing event to be rated, and rating and summarizing the event by traversing a plan selection rule set and processing conditions within the plan selection rule set to select a price plan, traversing an algorithm selection rule set of the selected price plan and processing conditions within the algorithm selection rule set to select a rating algorithm, and processing the rating algorithm to rate the event with each condition comprising an event qualification determination program.

9. A computer readable storage medium storing a process for controlling a computer to rate an event by traversing a plan selection rule set to select a price plan to evaluate and traversing an algorithm selection rule set to select an algorithm guiding the event to algorithms to calculate or modify a price and managing dependencies between price plans rating the event.

10. A process, comprising:
    obtaining an event to be rated;
    evaluating the decision network to determine an applicable price plan to process;
    evaluating a condition during processing of the price plan;
    processing a decision network within the applicable price plan to select a rating algorithm; and
    processing the rating algorithm selected during processing of the applicable price. plan guiding the event to algorithms to calculate or modify a price and managing dependencies between price plans rating the event.

11. A process as recited in claim 10, wherein said condition comprises an event qualification determination program.

12. A process as recited in claim 10, wherein said evaluating the decision network traverses a plan selection rule set to select a price plan to evaluate and traverses an algorithm selection rule set to select an algorithm to rate the event.

13. A process as recited in claim 10, wherein said evaluating the decision network processes a global decision network to select a price plan, processes a price plan decision network to select a rating algorithm and processes the algorithm to rate the event.

14. An apparatus, comprising:
    a processor obtaining an event to be rated, evaluating a decision network to determine within an applicable price plan according to the event to be processed, and processing the decision network within the applicable price plan selecting a rating algorithm guiding the event to algorithms to calculate or modify a price and managing dependencies between price plans rating the event.

15. An apparatus, comprising:

storage storing a price plan and a corresponding decision network; and a processor obtaining a telecommunications event to be rated, evaluating the decision network to determine an applicable price plan according to the telecommunications event to process, and processing the decision network within the applicable price plan selecting a rating algorithm guiding the telecommunications event to algorithms to calculate or modify a price and managing dependencies between price plans rating the telecommunications event.

16. An apparatus, comprising:

storage storing a price plan and a corresponding decision network; and a processor obtaining a telecommunications event to be rated, and rating and summarizing the telecommunications event by evaluating the price plan using the decision network, the decision network comprising a plan selection rule set selecting the price plan according to the telecommunications event, and an algorithm selection rule set according to the price plan selected guiding the telecommunications event to algorithms to calculate or modify a price, and managing dependencies between price plans rating the telecommunications event.

17. A computer readable storage medium storing a process for controlling a computer to rate a telecommunications event by traversing a plan selection rule set to select a price plan to evaluate and traversing an algorithm selection rule set guiding the telecommunications event to algorithms to calculate or modify a price and managing dependencies between price plans rating the telecommunications event.

18. A process, comprising:

obtaining a telecommunications event to be rated;

evaluating the decision network to determine an applicable price plan to process;

evaluating a condition during processing of the price plan;

processing a decision network within the applicable price plan to select a rating algorithm; and processing the rating algorithm selected during processing of the applicable price plan guiding the telecommunications event to algorithms to calculate or modify a price and managing dependencies between price plans rating the telecommunications event.

* * * * *